United States Patent
Chao et al.

(10) Patent No.: US 10,073,855 B2
(45) Date of Patent: Sep. 11, 2018

(54) DYNAMIC AND OPTIMIZED MANAGEMENT OF GRID SYSTEM RESOURCES

(71) Applicant: Exagrid Systems, Inc., Westborough, MA (US)

(72) Inventors: Yee-ching Chao, Nashua, NH (US); Peter Watkins, Newton Center, MA (US); Thomas G. Hansen, Bellingham, MA (US); Stephen A. Smith, Bedford, NH (US); Luis Arruda, Wrentham, MA (US); Adrian T. VanderSpek, Worcester, MA (US)

(73) Assignee: Exagrid Systems, Inc., Westborough, MA (US)

( * ) Notice: Subject to any disclaimer, the term of this patent is extended or adjusted under 35 U.S.C. 154(b) by 397 days.

(21) Appl. No.: 14/718,702

(22) Filed: May 21, 2015

(65) Prior Publication Data

US 2016/0342618 A1 Nov. 24, 2016

(51) Int. Cl.
*G06F 17/30* (2006.01)
*G06F 9/50* (2006.01)
(Continued)

(52) U.S. Cl.
CPC ........ *G06F 17/30174* (2013.01); *G06F 9/505* (2013.01); *G06F 11/1453* (2013.01);
(Continued)

(58) Field of Classification Search
CPC ......... G06F 17/30174; G06F 17/30156; G06F 9/505; G06F 11/1453; G06F 11/1464;
(Continued)

(56) References Cited

U.S. PATENT DOCUMENTS

| 5,574,906 A | 11/1996 | Morris |
| 5,813,017 A | 9/1998 | Morris |

(Continued)

FOREIGN PATENT DOCUMENTS

| EP | 0 774 720 A2 | 5/1997 |
| EP | 0 774 720 A3 | 5/1997 |

(Continued)

OTHER PUBLICATIONS

Anonymous (May 2, 2012). "Throttling process (computing)—Wikipedia," located at <https://en.wikipedia.org/wiki/Throttling_process_(computing)>, last visited Apr. 11, 2018, 1 page.

(Continued)

*Primary Examiner* — Jay A Morrison
(74) *Attorney, Agent, or Firm* — Mintz Levin Cohn Ferris Glovsky and Popeo, P.C.

(57) ABSTRACT

A system, a method, and a computer program product for or managing grid server system resource(s) are disclosed. A processor of a grid server in a plurality of grid servers determines an ingestion rate of data received by the grid server for a backup. The ingestion rate corresponds to a speed of transferring of the received data into a memory of the grid server. The processor determines a deduplication and replication rate of the received data. Deduplication represents a deduplication of the received data by the grid server. Replication represents replication of the deduplicated received data to another server in the plurality of servers. The processor adjusts the deduplication and replication rate based on the ingestion rate.

39 Claims, 10 Drawing Sheets

(51) Int. Cl.
*G06F 11/14* (2006.01)
*G06F 11/30* (2006.01)
*G06F 11/34* (2006.01)

(52) U.S. Cl.
CPC ...... *G06F 11/1464* (2013.01); *G06F 11/1466* (2013.01); *G06F 17/30156* (2013.01); *G06F 11/3006* (2013.01); *G06F 11/3034* (2013.01); *G06F 11/3409* (2013.01)

(58) Field of Classification Search
CPC ............ G06F 11/1466; G06F 11/3006; G06F 11/3034; G06F 11/3409
See application file for complete search history.

(56) References Cited

U.S. PATENT DOCUMENTS

| | | | |
|---|---|---|---|
| 7,539,745 B1 | 5/2009 | Wang et al. | |
| 7,562,186 B2 | 7/2009 | Li et al. | |
| 7,769,722 B1 | 8/2010 | Bergant et al. | |
| 7,962,520 B2 | 6/2011 | Patterson et al. | |
| 8,285,957 B1* | 10/2012 | Nag Yasa | G06F 17/30156 707/693 |
| 8,315,985 B1* | 11/2012 | Ohr | G06F 11/1453 707/664 |
| 8,412,848 B2 | 4/2013 | Therrien et al. | |
| 8,447,740 B1 | 5/2013 | Huang et al. | |
| 8,812,738 B2 | 8/2014 | Therrien et al. | |
| 8,898,120 B1 | 11/2014 | Efstathopoulos | |
| 8,972,672 B1 | 3/2015 | Wallace et al. | |
| 9,110,898 B1* | 8/2015 | Chamness | G06F 17/30002 |
| 9,286,313 B1* | 3/2016 | Sharangpani | G06F 17/30153 |
| 9,384,205 B1* | 7/2016 | Gipp | G06F 17/30156 |
| 9,477,661 B1* | 10/2016 | Chamness | G06F 11/14 |
| 2002/0073106 A1 | 6/2002 | Parker et al. | |
| 2007/0239945 A1 | 10/2007 | Li et al. | |
| 2008/0195677 A1 | 8/2008 | Sudhakar et al. | |
| 2009/0182789 A1* | 7/2009 | Sandorfi | G06F 11/1004 |
| 2010/0306412 A1 | 12/2010 | Therrien et al. | |
| 2011/0119240 A1 | 5/2011 | Shapira | |
| 2011/0273982 A1* | 11/2011 | Akirav | G06F 17/30943 370/230 |
| 2012/0137173 A1 | 5/2012 | Burshan et al. | |
| 2012/0150798 A1 | 6/2012 | Dawson et al. | |
| 2012/0303680 A1 | 11/2012 | McLennan et al. | |
| 2013/0024435 A1 | 1/2013 | Poirier et al. | |
| 2013/0066868 A1 | 3/2013 | Hecker et al. | |
| 2014/0052700 A1 | 2/2014 | VanderSpek et al. | |
| 2014/0089260 A1 | 3/2014 | Amrhein et al. | |
| 2014/0143219 A1 | 5/2014 | Therrien et al. | |
| 2014/0258655 A1* | 9/2014 | Park | G06F 3/0641 711/159 |
| 2014/0279956 A1* | 9/2014 | Trimble | G06F 3/0641 707/692 |
| 2015/0326481 A1 | 11/2015 | Rector | |
| 2016/0253351 A1 | 9/2016 | Hansen et al. | |
| 2017/0046360 A1 | 2/2017 | Therrien et al. | |
| 2017/0060696 A1 | 3/2017 | Wellnitz et al. | |

FOREIGN PATENT DOCUMENTS

| | | |
|---|---|---|
| EP | 0 774 720 B1 | 5/1997 |
| EP | 2 698 732 A1 | 2/2014 |
| EP | 3 062 227 A1 | 8/2016 |
| EP | 3 098 714 A1 | 11/2016 |
| WO | WO-01/52116 A1 | 7/2001 |
| WO | WO-01/52116 A8 | 7/2001 |

OTHER PUBLICATIONS

Bhagwat, D. et al. (Dec. 2009). "Extreme Binning: Scalable, Parallel Deduplication for Chunk-based File Backup," located at <http://ieeexplore.ieee.org/stamp/stamp.jsp?tp=&arnumber=5366623> 9 pages.
1997 Research Paper, *Efficient Distributed Backup with Delta Compression* (Randal C. Burns, Darrell D.E. Long), 11 pages.
2000 Research Paper, *File System Support for Delta Compression* (Joshua P. MacDonald), 32 pages.
2002 Research Paper, *Cluster-based Delta Compression of a Collection of Files* (Zan Ouyang, Nasir Memon, Torsten Suel, Dimitre Trendafilov), 10 pages.
Extended European Search Report dated Nov. 22, 2013, for EP Application No. 13180747.1, filed Aug. 16, 2013, 5 pages.
Extended European Search Report dated Aug. 2, 2016, for EP Application No. 16157662.4, filed Feb. 26, 2016, 7 pages.
Extended European Search Report dated Feb. 23, 2017 for EP Patent Application No. 16184062.4, 7 pages.
Extended European Search Report dated Mar. 23, 2017, for EP Application No. EP16184063.2, filed on Aug. 12, 2016, 8 pages.
Microsoft, "Edit Replication Schedules and Bandwidth," (Oct. 2013), located at <https://docs.microsoft.com/en-us/previous-versions/windows/it-pro/windows-server-2008-R2-and-2008/cc732278(v=ws.11)> last visited Feb. 20, 2018, 2 pages.

* cited by examiner

FIG. 6.

| RANGE LOW | RANGE HIGH | COMMAND |
|---|---|---|
| 30% | 100% | ThrottleMinSpeed |
| 20% | 30% | ThrottleDown |
| 5% | 20% | Neutral |
| 0% | 5% | ThrottleUp |

600

DYNAMIC AND OPTIMIZED MANAGEMENT OF GRID SYSTEM RESOURCES

TECHNICAL FIELD

In some implementations, the current subject matter relates to data processing, and in particular, to a dynamic and optimized management of grid system resources.

BACKGROUND

Many information technology ("IT") operations and activities can be scheduled to run one or more times within some periodic cycle (daily, weekly, monthly, quarterly, etc.). One such application can be data backup. Data backups can be essential to preserving and recovery of data in the event of data loss, for example. To avoid interfering with daily user activities, data backups can be performed during periods of low application server utilization, typically, on weeknights and on weekends. The backup job workload can be the same or different depending on how much data needs to be protected and when. In some applications, backup jobs can be scheduled and/or configured using a commercial backup application, an operating system shell scripting, and/or in any other manner.

Backup applications employ a plurality of techniques to manage data designated for backup. One such technique includes deduplication. Deduplication can be used to eliminate redundancy in data stream created during the execution of periodically executed backup tasks. In some cases, deduplication can reduce data storage capacity consumption as well as an inter-site network bandwidth. It can do so by identifying and eliminating similar and/or identical sequences of bytes in a data stream. Deduplication can also include computation of cryptographic and/or simple hashes and/or checksums, as well as one or more forms of data compression (e.g., file compression, rich media data compression, delta compression, etc.).

Deduplication involves identifying similar or identical patterns of bytes within a data stream, and replacing those bytes with fewer representative bytes. By doing so, deduplicated data consumes less disk storage capacity than data that has not been deduplicated and when the data stream must be transmitted between two geographically separate locations, consumes less network bandwidth. Adaptive deduplication strategies combine inter-file and/or intra-file discovery techniques to achieve the aforementioned goals.

Deduplication can be used to reduce the amount of primary storage capacity that is consumed by email systems, databases and files within file systems. It can also be used to reduce the amount of secondary storage capacity consumed by backup, archiving, hierarchical storage management ("HSM"), document management, records management and continuous data protection applications. In addition, it can be used to support disaster recovery systems which provide secondary storage at two or more geographically dispersed facilities to protect from the total loss of data when one site becomes unavailable due to a site disaster or local system failure. In such a case, deduplication helps to reduce not only the amount of data storage consumed, but also the amount of network bandwidth required to transmit data between two or more facilities.

Conventional deduplication-based data storage systems perform site-wide deduplication by using a single compute server that is responsible for deduplicating all data stored on one or more simple disk storage units that have no deduplication processing capability. However, these deduplication systems typically suffer from availability issues, where failure/loss of a single compute server can render all data stored on the simple disk units inaccessible to the users and/or other systems. As the amount of backup data increases, additional disk storage units are added, but since they cannot assist in deduplication processing, the end-to-end backup time of these systems increases to the point where it exceeds the backup window limits of the IT department's service level agreement.

Thus, there is a need for a deduplication server grid system that can manage data backup ingestion, deduplication and/or replication activities of incoming backup data streams, and maintain a constant backup window as the amount of data to be backed up increases over time.

SUMMARY

In some implementations, the current subject matter relates to a computer implemented method for managing a grid system resource(s). The method can be performed by a processor of a grid server in a plurality of grid servers. The method can include determining an ingestion rate of data received by the grid server for a backup, the ingestion rate corresponding to a speed of transferring of the received data into a memory of the grid server, determining a deduplication and replication rate of the received data, deduplication representing a deduplication of the received data by the grid server and replication representing replication of the deduplicated received data to another server in the plurality of servers, and adjusting the deduplication and replication rate based on the ingestion rate.

In some implementations, the current subject matter can include one or more of the following optional features. The adjustment of the deduplication and replication rate can include increasing when the ingestion rate is less than or equal to a first predetermined threshold (e.g., 0-5%). The adjustment of the deduplication and replication rate can include unchanging the deduplication and replication rate when the ingestion rate is greater than the first predetermined threshold (e.g., 5%) and less than or equal to a second predetermined threshold (e.g., 20%). The adjustment of the deduplication and replication rate can include reducing the deduplication and replication rate when the ingestion rate is greater than the second predetermined threshold (e.g., 20%) and less than or equal to a third predetermined threshold (e.g., 30%). The adjustment of the deduplication and replication rate can include setting the deduplication and replication rate to a predetermined minimum deduplication and replication rate when the ingestion rate is greater than the third predetermined threshold (e.g., greater than 30%).

In some implementations, ingestion, deduplication and replication of data can be performed in parallel. In some implementations, The adjustment of the deduplication and replication rate can include monitoring at least one of the following: a backup process, deduplication and replication processes, a restore process, a copy-to-tape process, a cross-replication process, a purge process, a rebalance process as performed by the grid server. The adjustment can also include performing, based on the monitoring, sampling of at least one of the following: the ingestion rate, and the deduplication and replication rate. The method can also include performing, based on the monitoring and the sampling, using the grid server, at least one of the following: increasing the deduplication and replication rate, decreasing the deduplication and replication rate, increasing the ingestion rate, decreasing the ingestion rate, increasing a protection rate corresponding a combination of the deduplication rate and the replication rate, decreasing the protection rate, and/or any combination thereof. In some implementations, sampling can be performed based on at least one of the following: periodically, automatically, and during a predetermined time interval. The method can also include minimizing, based on the sampling and parallel performance of ingestion, deduplication and replication of data, a recovery point objective time associated with the received data. The recovery point objective time can represent a difference between times when the data is received into the memory of the grid server and when the data is received into a memory of another grid server. The memories of the grid server and another grid server can include at least one of the following: a non-volatile storage medium and a volatile storage medium.

In some implementations, sampling can be performed based on at least one of the following parameter: amount of data stored in a network socket receive buffer associated with the grid server, data packet round trip time associate with transmission of data between at least two grid servers, transmission control protocol advertised receive buffer size, bandwidth of a network including the grid server, a time to complete at least one disk read/write input/output request associated with the grid server, and/or any combination thereof. The method can also include performing smoothing of the at least one parameter over a predetermined period of time, generating, based on the smoothing, an ingestion score value, comparing the generated ingestion score value with a threshold ingestion score value, and performing, based on the comparing, the adjusting of the deduplication and replication rate.

In some implementations, the received data can be stored temporarily in a temporary storage location of the grid server. The method can also include transferring the received data from the temporary storage location of the grid server for deduplication and replication by the grid server. Further, the method can include performing, based on the received data temporarily stored in the temporary storage location of the grid server, at an increased speed at least one of the following: generating at least one backup tape, generating at least one virtual machine image, performing an instant recovery of the received data from the temporary storage location, and restoring at least one file.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 6 illustrates an exemplary input/output rate table that can be used to determine whether or not to change the deduplication and/or replication activity based on the ingestion rate, according to some implementations of the current subject matter;

DETAILED DESCRIPTION

Figure 1:
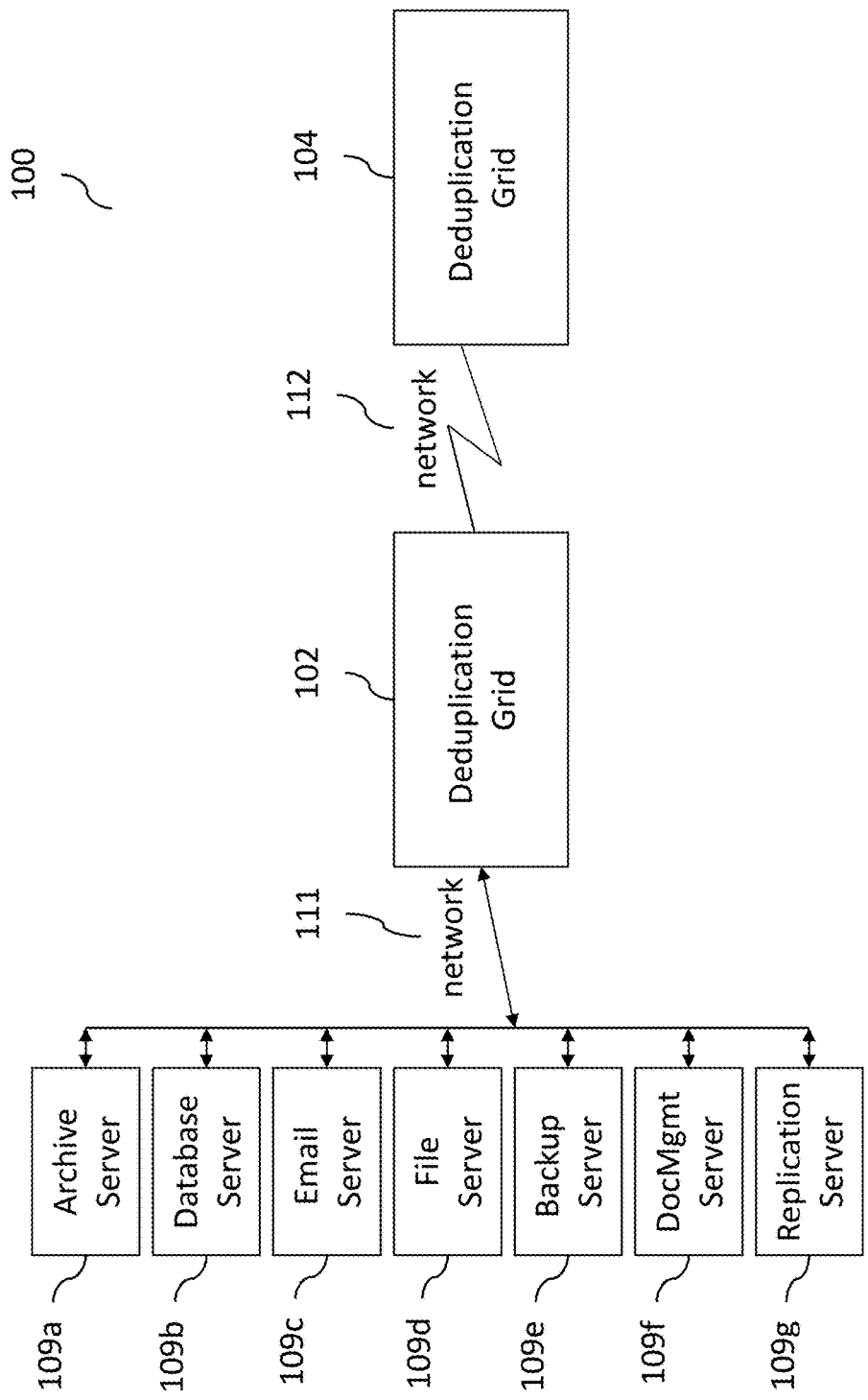
FIG. 1 illustrates an exemplary data deduplication system for deduplicating a stream of data received from a variety of sources, according to some implementations of the current subject matter.

To address these and potentially other deficiencies of currently available solutions, one or more implementations of the current subject matter provide methods, systems, articles or manufacture, and the like that can, among other possible advantages, provide for a deduplication of data using a scalable server grid system and for a dynamic and/or optimized management of resource of such grid system.

In some implementations, the current subject matter can perform processing of one or more streams of data (e.g., backup streams of data or any other data streams). The data stream can include a plurality data zones and each zone can be associated with a zone stamp that can identify that zone. The current subject matter can generate such zones and zone stamps based on the analysis of the received data steam(s). The zone stamps can be compared to one another (whether or not the zones are within the same data stream or not).

Deduplication can reduce data storage capacity consumption and/or inter-site network bandwidth requirements. Further, data deduplication can reduce an amount of data storage capacity that can be consumed by primary, backup, archive, etc. data storage systems. Further, deduplication can be effective in eliminating redundant data from being transferred across cost and/or bandwidth limited inter-site networks. Deduplication methods can be executed within and/or among a logical collection of internetworked compute and/or data storage servers, which can be referred to as grid servers. Grid servers can receive incoming stream(s) of data for deduplication, store data locally, and/or optionally replicate and store remotely for some period of time. From this incoming data, zones can be created. Zones can be contiguous and/or non-contiguous segments of the incoming data, e.g., entire files, segments of files, an aggregation of multiple files, etc. For each zone in a data stream, a zone stamp can be generated and/or computed based on a content of the zone's data bytes.

A zone stamp can be a string containing up to 64 characters (and/or any other number of characters), which, in some exemplary implementations, can be smaller than or equal to the size of the zone it represents. Because of the smaller size of zone stamps, the entire list of zone stamps can be stored in a main memory (e.g., a high-speed memory location) to allow them to be quickly and/or efficiently compared to each other in order to identify zones whose content is similar and/or identical and/or substantially identical to one another. Such zones of data can then be delta compressed against each other so that the zones can be replaced by one unaltered zone and another delta compressed zone that can contain just the bytes that are different between the zones.

In some implementations, the current subject matter relates to a deduplication grid server network that can perform deduplication of data. The grid server network can include a plurality of grid servers or nodes that are communicatively coupled to one another, where each grid server can include disk storage capacity, processing units, memory capacity, and/or networking ports for performing deduplication methods. The servers can be communicatively coupled using any type of network (e.g., wide area network ("WAN"), local area network ("LAN"), metropolitan area network ("MAN"), internet, extranet, intranet, and/or any other type of wireless and/or wired network).

Using the grid server architecture, each grid server can execute grid deduplication methods on data that can be stored within its own server. This process can be performed by the grid server independently and/or in parallel with other grid servers in the grid server network. Further, since grid servers can be interconnected via the grid server network, they can cooperate and/or communicate with one another to perform deduplication of data across all grid servers in the deduplication grid server network. This grid deduplication activity within and among multiple grid servers can provide scalable performance that can be commensurate with primary storage capacity growth.

Additionally, a loss of any grid server(s) within the network may affect the availability of the zones that it is responsible for storing, however, the current subject matter's grid server network can provide for failover/recovery models, whereby each grid server in the network can be a peer within the grid server network and any services can be relocated from the failed grid server to the remaining operational grid servers.

FIG. 1 illustrates an exemplary data deduplication system 100 for deduplicating a stream of data received from a variety of sources 109 (a, b, c, d, e, f, g). The source 109 can include an archive server 109a, a database server 109b, an email server 109c, a file server 109d, a backup server 109e, a document management server 109f, a replication server 109g, as well as any other application, business object, business process, business process application, server, software, hardware, etc. The system 100 can further include deduplication grids 102, 104 and networks 111, 112. The network 111 can communicatively couple the deduplication grid 102 and source of a data stream 109 and the network 112 can communicatively couple the deduplication grid 102 and the deduplication grid 104. In some implementations, the deduplication grid 102 can be located in the same physical location as the sources 109. Alternatively, the grid 102 can be remote from the sources 109. The grid 104 can be remotely located from the sources 109 and/or grid 102. For example, the grid 104 can be a disaster recovery site for the data received from the source 109.

The grids 102 and/or 104 can include one or more computing devices, systems, servers, hardware, software, and/or any combination of hardware and/or software, which can be communicatively coupled with one another using various wireless and/or wired connections, networks, etc. The networks 111, 112 can be any wireless and/or wired networks, WAN, MAN, LAN, Internet, extranet, intranet, as well any other type of network.

In some embodiments, the deduplication grid 102 can receive data stream(s) from sources 109 and can perform an initial deduplication of the received data. Additionally, the grid 102 can also perform reconstituting original un-deduplicated data, when requested to do so by source(s) 109. The deduplicated data can be stored in a storage subsystem local to the grid 102 (not shown in FIG. 1). The deduplicated data can be sent to grid 104 and stored in a storage subsystem local to the grid 104 (not shown in FIG. 1). For example, critical application data can be stored at a local facility (e.g., as represented by the grid 102) and at a geographically distant remote facility (e.g., as represented by the grid 104) in order to provide for a full recovery in the event of system failure, site disaster, or any other unprecedented condition or event.

Figure 2A:
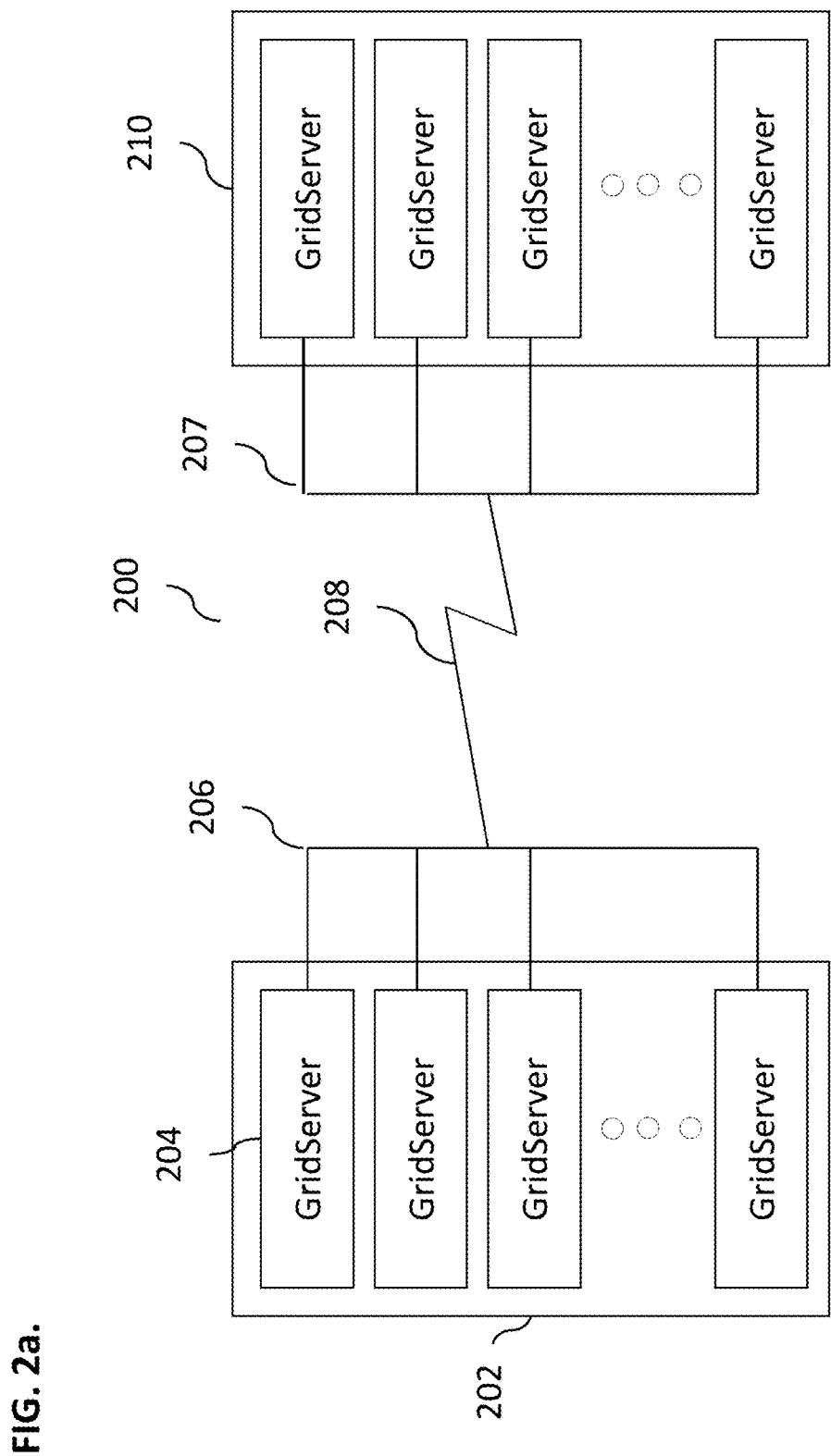
FIG. 2a illustrates an exemplary network, according to some implementations of the current subject matter.

FIG. 2a illustrates an exemplary network 200, according to some implementations of the current subject matter. The network 200 can include a plurality of network sites 202 and 210 are shown in FIG. 2a), each having a deduplication grid containing a plurality of deduplication grid servers 204. The grid servers 204 within each site 202 and 210 can be communicatively coupled using any wireless and/or wired networks, WAN, MAN, LAN, Internet, extranet, intranet, as well any other type of network 206 and/or 207. The sites 202 and 210 can be communicatively coupled using any wireless and/or wired networks, WAN, MAN, LAN, Internet, extranet, intranet, as well any other type of network 208.

In some implementations, the current subject matter can provide a multi-stage and/or multi-level deduplication of streams of data, which can be received by one or more servers in the network 200. In some implementations, the data stream that can be received can be split into a plurality of zones that can be matched against one another in order to determine whether or not zones are similar to one another, identical, and/or substantially similar (e.g., zones that include similar data content). Zones having similar, identical, and/or substantially similar data content can be deduplicated using delta compression and/or data compression. Other zones that are not similar, identical, and/or substantially similar to any other zone in the received data stream can be further processed using data compression. These size-reduced zones can then be transmitted across network 208, which can save network bandwidth and accelerate the time it can take to replicate all of the zones.

In some implementations, the current subject matter can perform multiple sequential operations during processing of backup data stream(s) into deduplicated and/or replicated zones. The operations can include at least one of the following: backup stream splitting, stamp creation, stamp redistribution, stamp matching, grid delta compression, rebalancing, purging, and/or any other operations and/or any combination thereof. The zones can be purged from the server grid when they are no longer required to be accessed by any of these applications 109. In some implementations, stream splitting, stamp creation, stamp matching, grid delta compression, rebalancing, and/or purging can be performed asynchronously to one another. This can be done to maximize utilization of system resources. The following is a discussion of each of these processes and how such processes can be performed by each grid server in the grid independently while other processes are performed across other servers.

In some implementations, the current subject matter system can perform data stream (e.g., backup stream) splitting and/or stamp creation in accordance with an exemplary process described in U.S. Pat. No. 8,412,848 to Therrien et al., issued Apr. 2, 2013, which is incorporated herein by reference in its entirety. In some implementations, each grid server in the grid server network can perform data stream splitting independently and form zones based on the received data as well as create zone stamps for each formed zones. Each grid server can receive a data stream that can be specifically destined for that particular server and/or, alternatively, grid servers can receive one data stream that can be destined for the network and determine how to split the data stream for further processing by each grid server. Each grid server can create a stamp table that can represent all of the zones that were created within that grid server based on the data in the incoming data stream. The stamp tables can be virtual stamp tables. These stamp tables can be sorted from smallest to largest zone size in order to accelerate downstream stamp matching process. During stamp matching, zone stamps whose zone sizes are +/−P percent different in size can be considered for matching in order to accelerate the stamp matching process.

Figure 2B:
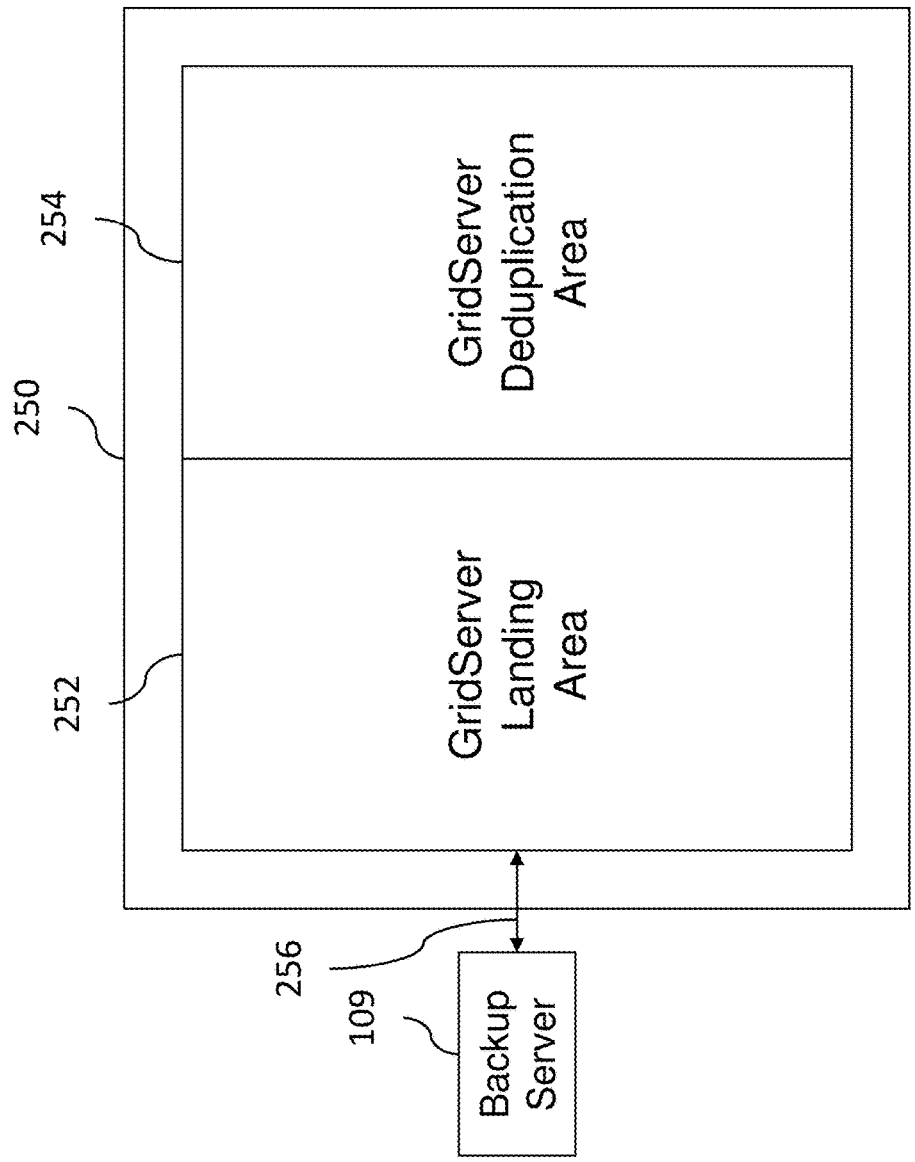
FIG. 2b illustrates an exemplary system for an internal logical storage structure of a grid server, according to some implementations of the current subject matter.

FIG. 2b illustrates an exemplary system 250 for an internal logical storage structure 250 of a grid server, according to some implementations of the current subject matter. The structure 250 can be included a grid server 204 (as shown in FIG. 2a) and can include a grid server landing area 252 and a grid server deduplication area 254. A backup server 109 (as shown in FIG. 1) can be communicatively coupled to the structure 250, and in particular, to the grid server landing area 252.

The backup server 109 can transmit streams of backup data 256 to the grid server 204 (as shown in FIG. 2a). The backup data stream 256 can be stored in the grid server landing area 252 for the purposes of "awaiting" performance of the backup process by performing compression and/or deduplication in parallel on incoming data stream 256. The grid server landing area 252 can include a sufficient storage capacity to cache at least the most recent full backup and/or one or more previous backups. The data stream 256 can be temporarily stored in the grid server landing area 252 and can provide at least one of the following benefits. Data backups can be completed in a shorter amount of time because deduplication and/or compression do not take place simultaneously.

Further, requests to restore data are typically directed to the most recent backup data. This data can be cached in the in the grid server landing area 252 until more backups streams cause that data to be "ejected" from grid server landing area 252 and into the grid server deduplication area 254. In some implementations, such requests to restore data from the grid server landing area 252 might not require that data is reassembled from deduplicated chunks (if the data is restored from the data that has been deduplication/replicated). The restored data can be residing in an uncompressed and/or undeduplicated form in the grid server landing area 252, which can accelerate restore operations.

Moreover, for backup system deployments where one or more grid servers are only deployed at a primary site and not at a secondary disaster recovery site, backup tapes can be created for storage offsite at a tape storage facility. These tapes can be produced from the grid server landing area 252 as soon as a backup job is completed. With the most recent backup data stored in uncompressed and/or undeduplicated form in the grid server landing area 252, the throughput of creating a tape copy can be accelerated as opposed to creating a tape copy from deduplicated data, which can require undeduplication (or "rehydration") of data before writing it to tape.

Additionally, for virtual machine backups, the grid server landing area 252 can provide a fast and accessible NAS storage area for performing an instant recovery of data using the grid server 204 as a temporary primary storage subsystem in the event of a loss of one or more virtual machine primary storage subsystems. This can accelerate the time that it can take to recover from the loss of virtual machine primary storage.

In some implementations, data stored in the grid server landing area 252 can be deduplicated at any time and the resulting data can be stored in the grid server deduplication area 254 of the grid server 204. In some implementations, the current subject matter can perform a determination as to when to move the data stored in the grid server landing area 252 to the grid server deduplication area 254.

In some implementations, the grid server 204 can perform at least one of the following functions: backup/ingestion, deduplication, replication, and/or other functions/tasks.

The backup/ingestion function relates to receiving data from data management applications 109. Applications 109 typically send large amounts of data (e.g., gigabytes to terabytes) into one or more grid servers 204 (shown in FIG. 2a) for processing. The data can be sent based on a particular schedule that can be set by a backup administrator of the application 109. Minimizing an elapsed time to complete all daily backup jobs can be most critical to the backup administrator, since certain customer-facing applications may need to be paused until the backup is complete, and end-users that access that application can be delayed in performing their work until the backup task is complete.

Another function that can be performed by the grid server 204 can be deduplication. Deduplication tasks can be designed to receive data stream that has been ingested into the grid server 204 by a data management application, and segment it into zones. Each zone can be labeled a zone stamp, which can be an identifier that can be used to identify zones that have similar, substantially similar, substantially identical, and/or identical content. During the deduplication task, collection of zone stamps associated with newly created zones from a recent ingestion data stream can be compared against zone stamps that were previously created in order to identify similar zones using similarity of their respective stamps. When a pair of zones is identified as having similar zone stamps, the zones can be delta-compressed to reduce consumed data storage capacity.

Yet another function of the grid server 204 can be replication. In some implementations, a grid server 204 within the data center 202 can optionally have their backup data replicated across a network 208 to grid servers at another site 210. The site 210 can be referred to as a disaster recovery site. A backup administrator can define a predetermined recovery point objective ("RPO") for each backup data set based on, for example, criticality of the data. The RPO can be a measure of time (e.g., seconds, minutes, hours, etc.) that can represent an age of data at the second site as compared to the age of data stored at the primary site. Ideally, an RPO of zero seconds can allow an organization to resume operations up to the last transaction prior to the disaster at the primary site using grid servers at the second site. For most data, RPO can be specified in terms of hours, e.g., less than 24 hours.

In some implementations, other tasks that can be run by grid servers 204 can include at least one of the following: a restore task, a copy-to-tape task, a cross replication task, a purge task, a rebalance task, etc. In some implementations, the current subject matter can dynamically manage each of these additional grid server tasks and/or any other tasks. Further, the current subject matter can balance backup/ingestion tasks versus deduplication and/or replication tasks. In some implementations, the current subject matter, for the purposes of running these and/or any other tasks on the grid server 204, can dynamically manage grid server 204 processing, memory, networking, storage and/or any other resources to ensure that ingestion performance is not inhibited as well as to perform as much deduplication and/or replication as possible without reducing the ingestion rate. Ingestion performance can be one of the most important customer-visible criteria because the fastest ingestion performance can correspond to the shortest time to backup, thereby affecting end-user productivity if data backups take too long to complete. Further, during certain periods of time, ingestion performance can drop significantly due to delays introduced by the data management application, and/or bursty network protocols (e.g., NFS, CIFS), and/or slow data feeds from backup clients. The current subject matter can perform monitoring of the ingestion rate and upon determination that the rate is low, the grid server 204 can be instructed to increase deduplication and/or replication activity automatically. This can reduce recovery point objective time for data that is replicated to the second site 210.

Figure 3:
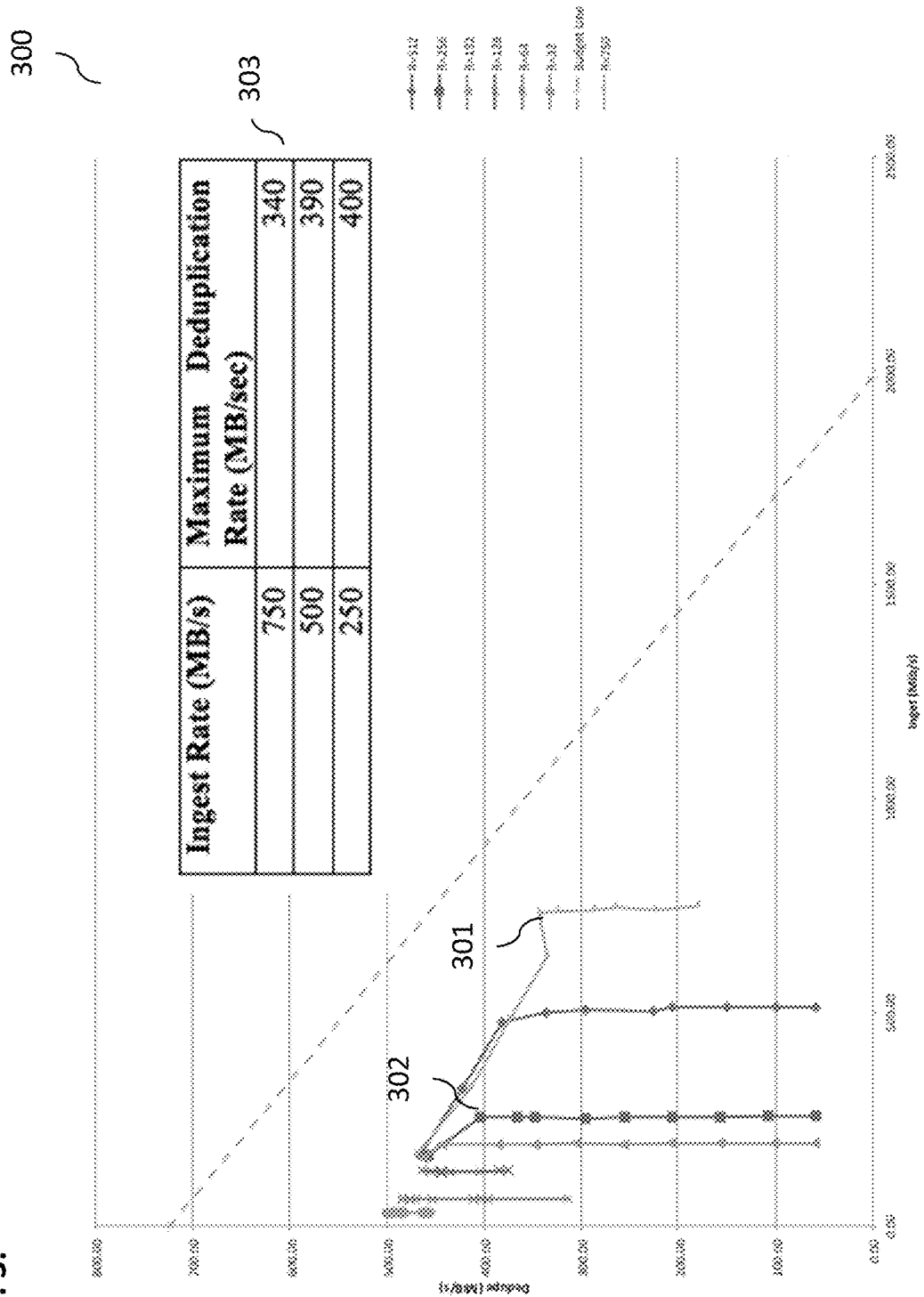
FIG. 3 illustrates an exemplary ingestion performance versus deduplication performance plot, according to some implementations of the current subject matter.

FIG. 3 illustrates an exemplary ingestion performance versus deduplication performance plot 300, according to some implementations of the current subject matter. The horizontal axis of the plot 300 represents ingestion performance and the vertical axis of the plot 300 represents deduplication performance. Both performances are measured in megabytes per second ("MB/sec"). FIG. 3 also illustrates an exemplary table 303 containing exemplary data points shown on the plot 300. A plot point 301 can correspond to an ingestion rate of approximately 750 MB/sec and the deduplication rate of approximately 340 MB/sec. Increasing the deduplication rate above this value can have a negative effect on the ingestion rate. If the ingestion rate drops to 250 MB/sec (e.g., because of slow backup clients, bursty networks protocols, slow data management application performance, etc.), as shown by plot point 302, the deduplication rate can increase to approximately 400 MB/sec. If the deduplication rate is increased more, the ingestion rate can be negatively affected. As can be understood, the values shown in FIG. 3 are presented for illustrative and non-limiting purposes only.

Figure 4:
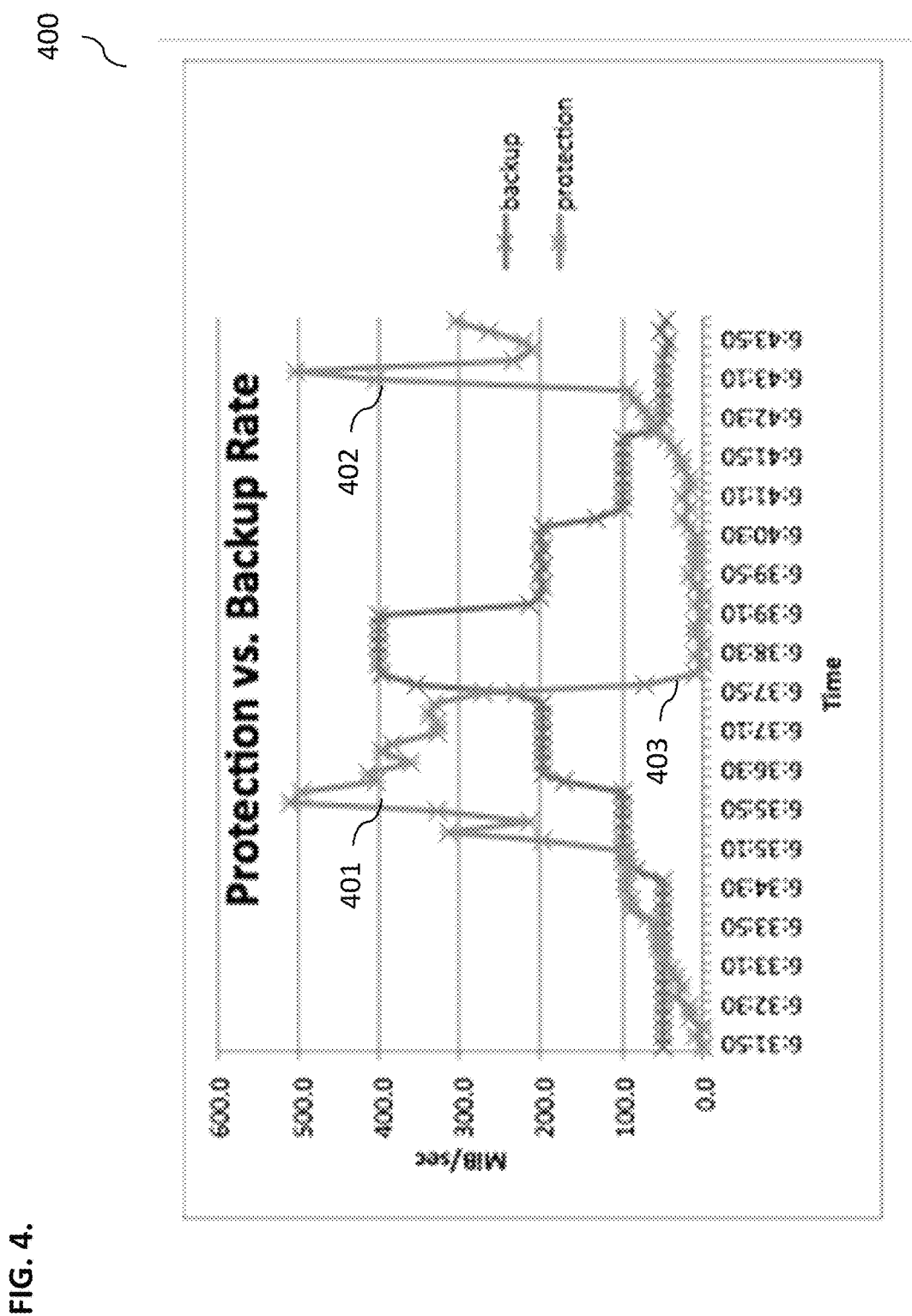
FIG. 4 illustrates an exemplary protection versus backup rate plot, according to some implementations of the current subject matter.

FIG. 4 illustrates an exemplary protection versus backup rate plot 400, according to some implementations of the current subject matter. The plot 400 can be time-based illustrating an increase in protection rate (which can correspond to a combination of deduplication and replication rates) upon automatic detection that backup ingestion performance has slowed, as shown by plot points 401, 402. Conversely, the plot 400 illustrates that as backup ingestion performance increases, as shown by a plot point 403, the protection rate can be quickly reduced in order to not prevent a delay of the ingestion function performed by a grid server. Thus, the current subject matter can perform a balancing of a fast ingestion rate of data and shortest time to deduplicate and/or replicate data to a second site.

Figure 5:
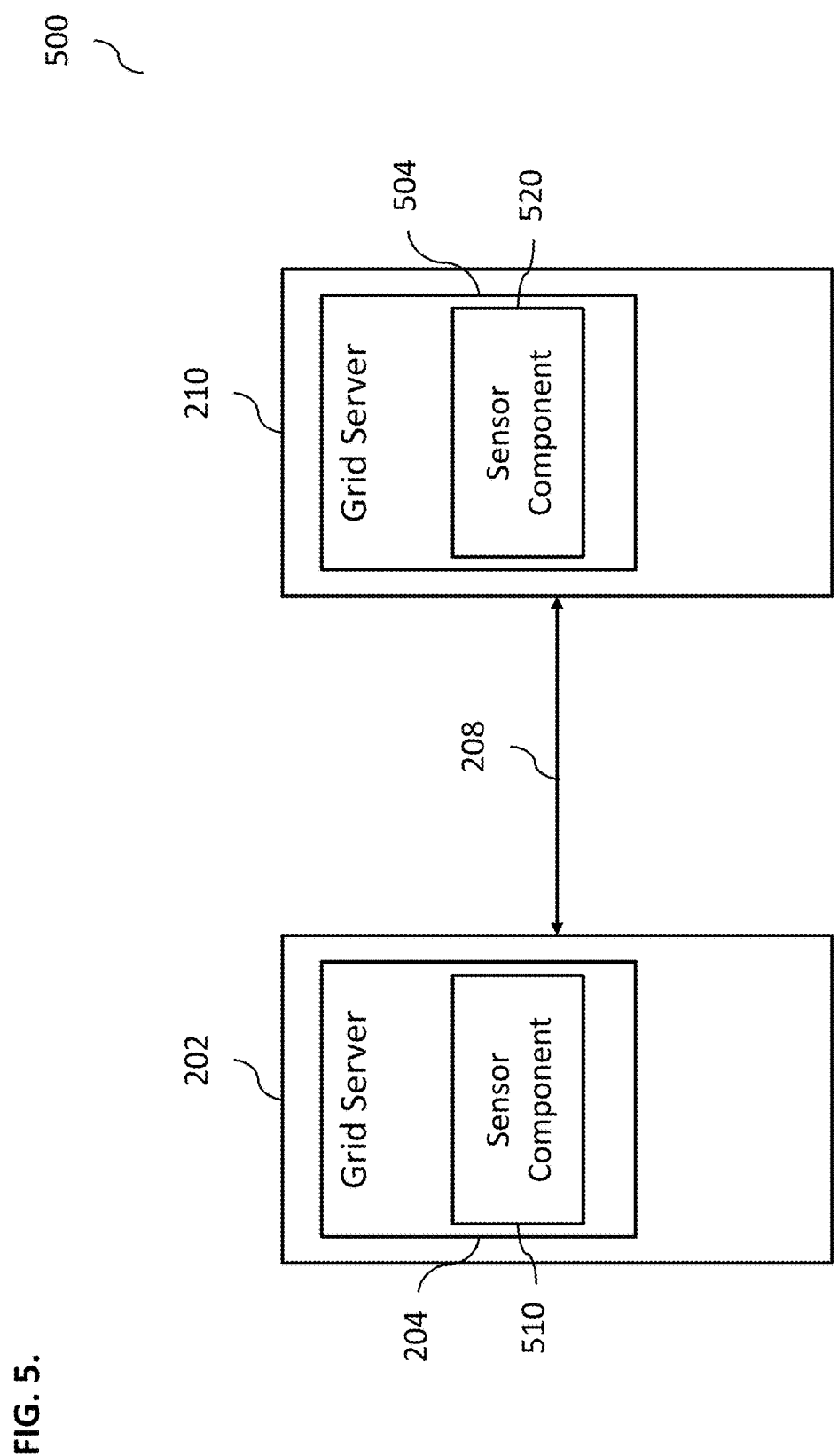
FIG. 5 illustrates an exemplary software sensor system, according to some implementations of the current subject matter.

FIG. 5 illustrates an exemplary software sensor system 500, according to some implementations of the current subject matter. The system 500 can include a grid server 204 disposed at a first site 202 (similar to system 200 shown in FIG. 2a) and a grid server 504 disposed at a second site 210. The sites 202 and 210 can be communicatively coupled using a network 208 (similar to the system 200 shown in FIG. 2a). The server 204 can include a sensor component 510 and the server 504 can include a sensor component 520. The sensor components 510, 520 can be software, hardware, and/or any combination of hardware and software.

In some implementations, the sensor components 510 and 520 can dynamically measure networking and/or disk utilization loads as well as available disk space. The sensor components 510, 520 can further perform sensing of "backpressure" on a system resource, and use this information to adapt the work load. When the ingestion performance drops to low levels, as detected by the sensor component(s), the corresponding grid server 204, 504 can automatically increase deduplication and/or replication activities on that grid server. The grid server 204, 504 can increase deduplication and/or replication workloads until a predetermined threshold at which any further workload on the grid server can negatively affect the ingestion performance. The sensor component(s) can increase deduplication and/or replication (shown as "protection" in FIG. 4) task loads conservatively (as shown by plot points 401, 402 in FIG. 4), but reduce deduplication and/or replication loads more aggressively (as shown by plot point 403 in FIG. 4).

In some implementations, the sensor components 510, 520 can uses operating system and/or network performance monitoring interfaces, to sample state(s) of active network sockets that are used for ingestion (e.g., via CIFS or NFS, or Symantec OST (OpenStorage Technology)). The sensor component(s) can determine how full a network socket receive buffer is (e.g., the sensor component can determine whether the amount of data in the receive buffer has reached a particular buffer overflow threshold and/or any other predetermined threshold). The sensor component(s) can also determine current network packet round-trip time and a transmission control protocol ("TCP") advertised receive buffer size to estimate potential network bandwidth. The sensor component(s) can also measure a percent of time spent waiting for disk read/write I/O requests to complete (e.g., using the Samba and NFS NAS protocol daemons). The information and/or data obtained from each sensor component can be averaged and/or smoothed over a predetermined time period. The predetermined time period can be a particular time period that can be selected for a grid server, a network of grid servers and/or any other network. Alternatively, the predetermined time period can be any time period. The averaging and/or smoothing can be performed for each sensor component individually and/or for a group of sensor components and/or for all sensor components. The determined values can be used to determine trends and/or consistencies in the data processed by the sensor component(s). In some implementations, the data obtained and/or processed by the sensor can include at least one of the following: network socket receive buffer, network packet round-trip delay, TCP-advertised receive buffer size, disk input/output ("I/O") wait time for server message block daemon ("SMDB"), network file storage daemon ("NFSD"), etc. and/or any combination thereof.

In some implementations, the sensor component(s) can combine one or more of the above sensor measurements (e.g., network socket receive buffer, network packet round-trip delay, TCP-advertised receive buffer size, disk I/O wait time for SMDB, NFSD, etc., and/or any combination thereof) into a single ingestion score. In some implementations, the ingestion score can be calculated by assigning a predetermined factor to each value (e.g., smoothed and/or averaged) obtained by the sensor component(s) and summing the resulting values. In some implementations, in determining the ingestion score, equal weight can be assigned to each value (smoothed and/or averaged) obtained by the sensor component(s). The determined ingestion score can be compared to a predetermined threshold ingestion score, which can be a preset value for a particular network, grid server, repository containing grid servers, etc. Based on the comparison, a determination can be made whether or not to adjust the deduplication and/or replication rate. The adjustment can be made using an input/output rate table 600 shown in FIG. 6.

FIG. 6 illustrates an exemplary input/output rate table 600 that can be used to determine whether or not to change the deduplication and/or replication activity based on the ingestion rate, according to some implementations of the current subject matter. The first two columns "Range Low" and "Range High" can refer a range of an ingestion rate at which a grid server (e.g., grid server 204 shown in FIG. 2a) can ingest incoming data streams. The "Range Low" column indicates lower boundary of the ingestion rate range and "Range High" column indicates upper boundary of the ingestion rate range. Each grid server can have its own rate table. Alternatively, a single rate table can be used for all or a portion of grid servers in a repository or repositories. The ingestion rate can be determined based on the Ethernet network interfaces that can be attached to each grid server. For example, if a grid server has 2×10 Gbit Ethernet interfaces, the maximum (100%) ingest rate can be 2 GBytes/second. Data being ingested at 30% ingestion rate can transfer data into a grid server at 600 MB/sec. In this example, deduplication and/or replication rate can be decreased and/or turned off, until the backup ingestion rate drops to 5% (100 MB/sec).

For the lowest ingestion performance (i.e., 0%-5%), the deduplication and/or replication rate can be increased to a predetermined maximum (i.e., "ThrottledUp"). When backup ingestion rate decreases because of slow backup clients and/or backup servers, and/or bursty network activity, the deduplication and/or replication rate can be increased in order to reduce the RPO parameter. The RPO parameter can be reduced at the second site (e.g., site 210 as shown in FIG. 2a).

For highest ingestion rate range (i.e., 30%-100%), the deduplication and/or replication rates can be reduced to a first predetermined minimum (e.g., "ThrottleMinSpeed") to allow ingestion rate to not be reduced by other grid server processing tasks. This can be an aggressive action that can reduce deduplication and/or replication rates to a minimum level.

For a higher range of ingestion rates (i.e., 20%-30%), deduplication and/or replication rates can be decreased to a second predetermined minimum (e.g., "ThrottledDown"). The second predetermined minimum can be greater than the first predetermined minimum. Such decrease can reduce deduplication and/or replication rates as backup rates (or ingestion rates) increase.

When there is a balance between ingestion rate and deduplication/replication rates (i.e., 5-20% of maximum ingestion performance), no change may need to be made for deduplication and/or replication rates (i.e., "Neutral" as shown in table 600).

In some implementations, a grid server's sensor component can sample data that is incoming for ingestion and then the grid server can use table 600 to determine whether ingestion rate needs to be increased or decreased or unchanged. The table 600 can also be used to limit protection rates so that the grid server does not exceed its highest rate, nor goes below the lowest rate. The table 600 can ensure that smoothing and/or hysteresis exist with regard to ingestion rate adjustments.

In some implementations, the grid server's sensor component can perform sampling of data at predetermined time periods. The time periods can be set for a particular grid server, all grid servers, and/or a portion of grid servers. The sampling can occur periodically, or at any preset time intervals (e.g., minutes, seconds, hours, every minute, every five minutes, etc.).

The time between sensor samples can be dependent on a time that it takes a grid server to read and/or deduplicate a chunk of data. By way of a non-limiting example, a 100 MB chunk of data can be read at a speed of 500 MB/s by a processor, which is equivalent to a time of 0.2 seconds. The chunk of data can be deduplicated at a speed of 200 MB/s, which his equivalent to 0.5 seconds. Thus, the total time that it takes to read and deduplicate a chunk of data is approximately 0.7 seconds. In some implementations, on average reading and/or deduplication of chunks of data can take approximately 1-2 seconds per chunk. Hence, collection of sensor samples for approximately 20 seconds would mean processing of 10-20 chunks before an adjustment can be made. As such, the time between sensor samples can be large enough to accommodate for reading and/or deduplication of data.

Further, the time between sensor samples can be dependent on the time that it takes a grid server to ingest and/or restore a backup. By way of a non-limiting example, a 100 GB backup data can be ingested at a speed of 200 MB/s by a processor, which is equivalent to a time of 512 seconds. Thus, waiting 20 seconds to execute a sensor sample can mean adjusting every 4% of the backup. As such, the time between sensor samples can be small enough to accommodate for ingestion and/or restore of data backup.

In some implementations, a time range during which sensor sampling can be performed can depend on a particular system, network, processor, memory, etc. configuration and/or capacity and/or capability. In an exemplary, non-limiting embodiment, sensor sampling can be performed every ten seconds.

Figure 7:
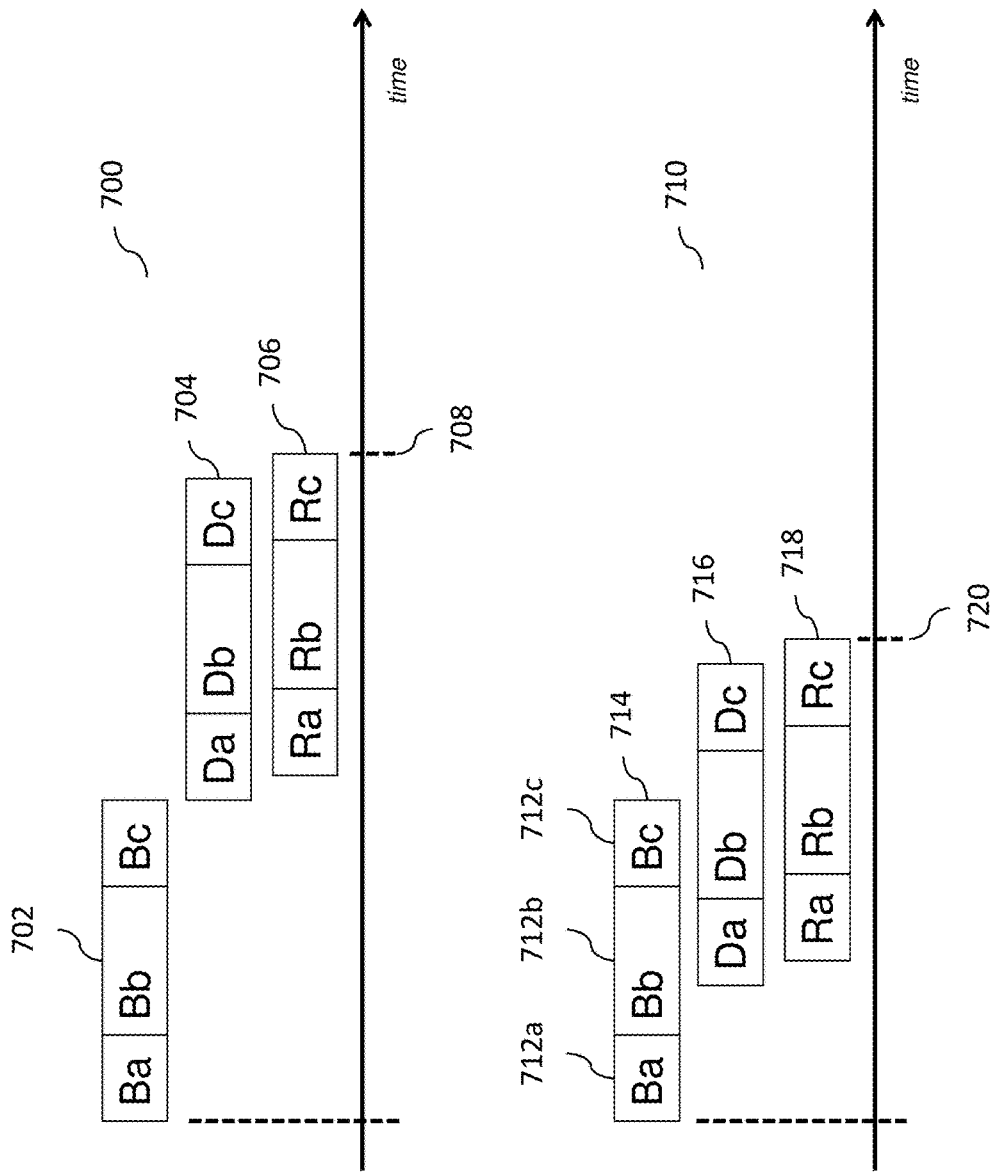
FIG. 7a, the time plot 700 illustrates a conventional way to manage deduplication and/or replication activity.
FIG. 7b illustrates an exemplary time plot showing benefits of using sensor sampling, according to some implementations of the current subject matter.

FIGS. 7a-b illustrate exemplary time plots 700 and 710 showing improvement of an elapsed recovery point objective ("RPO") time when current subject matter's ingestion sensor is used to manage deduplication and/or replication activity. In particular, as shown in FIG. 7a, the time plot 700 illustrates a conventional way to manage deduplication and/or replication activity. The plot 700 illustrates incoming backup data stream 702 that is to be processed by a grid server (not shown in FIG. 7). In conventional systems, the ingestion/processing of the data stream 702, typically, has to be completed prior to the beginning of the deduplication activity 704 and/or replication activity 706. Without monitoring of backup activity levels, execution of deduplication and/or replication functions simultaneously can negatively impact backup ingestion performance. Time 708 can be indicative of such negative effect of delaying deduplication and replication until backup activities are completed. The time 708 illustrates an extended elapsed time that may be required to have all data ingested, deduplicated, and replicated in its entirety to another site. Such delayed processing can affect inter-site network bandwidth, which can be limited, thereby making it important to send data across a network connection between two sites as soon as possible.

FIG. 7b illustrates an exemplary time plot 710 showing benefits of using sensor sampling, according to some implementations of the current subject matter. The plot 710 illustrates an incoming backup data stream 714 containing backup data portions or backup jobs 712a ("Ba"), 712b ("Bb"), and 712c ("Bc"). As shown in FIG. 7b, the deduplication and/or replication activities 716, 718, respectively, can occur in parallel with backup ingestion activity represented by the backup jobs 712 (a, b, c). By monitoring backup 714 activity levels using ingestion sensor components (as shown in FIG. 5), and managing rate(s) of deduplication and replication (corresponding to deduplication 716 and replication 718, respectively) to ensure that ingestion performance is not negatively impacted by the increased use of grid server resources, the resulting elapsed time 720 for data to be ingested, processed, deduplicated and replicated to another site can be reduced (as shown in FIGS. 7a and 7b, time 708 is greater than time 720). Additionally, in view of the sensor sampling and managing rate(s) of deduplication/replication, the inter-site network bandwidth can be more efficiently utilized, whereby data can be transmitted across the network connecting two sites as soon as possible.

Further, by way of a non-limiting example, as shown in FIG. 7b, assuming that backup job "Ba" 712a is a high-performance backup activity (i.e., any deduplication and/or replication activity can reduce the ingestion performance), during the time period when "Ba" is being ingested, no deduplication and/or replication can be executed. As shown in FIG. 7b, the deduplication 716 and/or replication 718 activities begin after ingestion of backup job "Ba" 712a is completed.

Assuming that backup job "Bb" 615b is not a high-performance backup activity and, instead, runs slow. The ingestion sensor component (as shown in FIG. 5) can detect the low backup ingestion performance and allow some deduplication 716 and/or replication 718 activity to occur simultaneously or in parallel with ingestion activity of backup job "Bb" 712b. As shown in FIG. 7b, the ingestion activity of backup job "Bb" 712b can occur in parallel with at least the deduplication activity "Da" and replication activity "Ra". The deduplication activity "Da" and replication activity "Ra" correspond to the ingestion backup job "Ba" 712a. Similarly, deduplication activity "Db" and replication activity "Rb" correspond to the ingestion backup job "Bb" 712b; and deduplication activity "Dc" and replication activity "Rc" correspond to the ingestion backup job "Bc" 712c.

As shown in FIG. 7b, the backup job "Bc" 712c can also have a low ingestion rate. Thus, the deduplication 716 and/or replication 718 activities can also operate in parallel with the ingestion backup job 712c. This is shown by having the ingestion activity of backup job "Bc" 712c occurring in parallel with at least the deduplication activity "Db" and replication activity "Rb".

Figure 8:
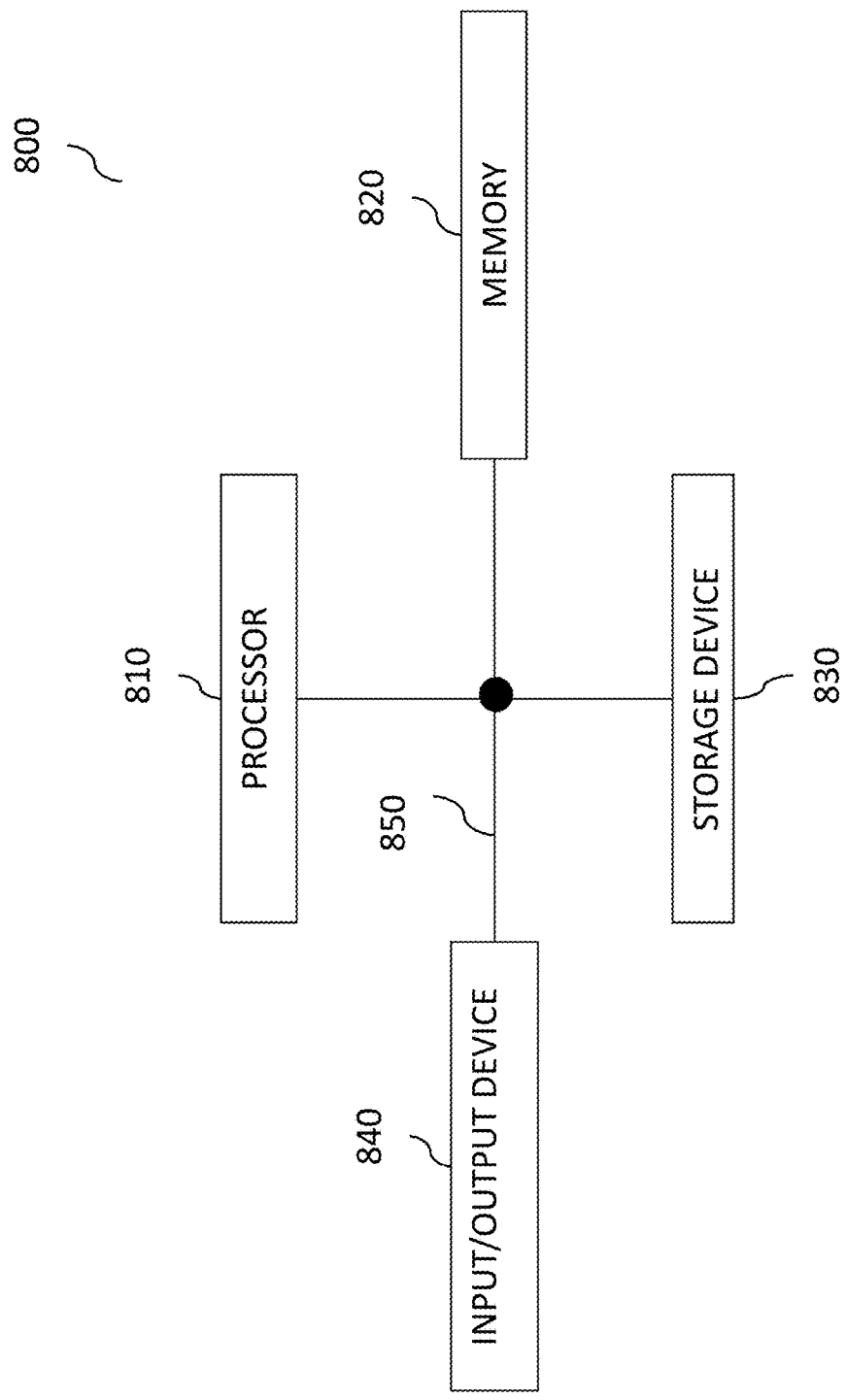
FIG. 8 illustrates an exemplary system, according to some implementations of the current subject matter.

In some implementations, the current subject matter can be configured to be implemented in a system 800, as shown in FIG. 8. The system 800 can include a processor 810, a memory 820, a storage device 830, and an input/output device 840. Each of the components 810, 820, 830 and 840 can be interconnected using a system bus 850. The processor 810 can be configured to process instructions for execution within the system 800. In some implementations, the processor 810 can be a single-threaded processor. In alternate implementations, the processor 810 can be a multi-threaded processor. The processor 810 can be further configured to process instructions stored in the memory 820 or on the storage device 830, including receiving or sending information through the input/output device 840. The memory 820 can store information within the system 800. In some implementations, the memory 820 can be a computer-readable medium. In alternate implementations, the memory 820 can be a volatile memory unit. In yet some implementations, the memory 820 can be a non-volatile memory unit. The storage device 830 can be capable of providing mass storage for the system 800. In some implementations, the storage device 830 can be a computer-readable medium. In alternate implementations, the storage device 830 can be a floppy disk device, a hard disk device, an optical disk device, a tape device, non-volatile solid state memory, or any other type of storage device. The input/output device 840 can be configured to provide input/output operations for the system 800. In some implementations, the input/output device 840 can include a keyboard and/or pointing device. In alternate implementations, the input/output device 840 can include a display unit for displaying graphical user interfaces.

Figure 9:
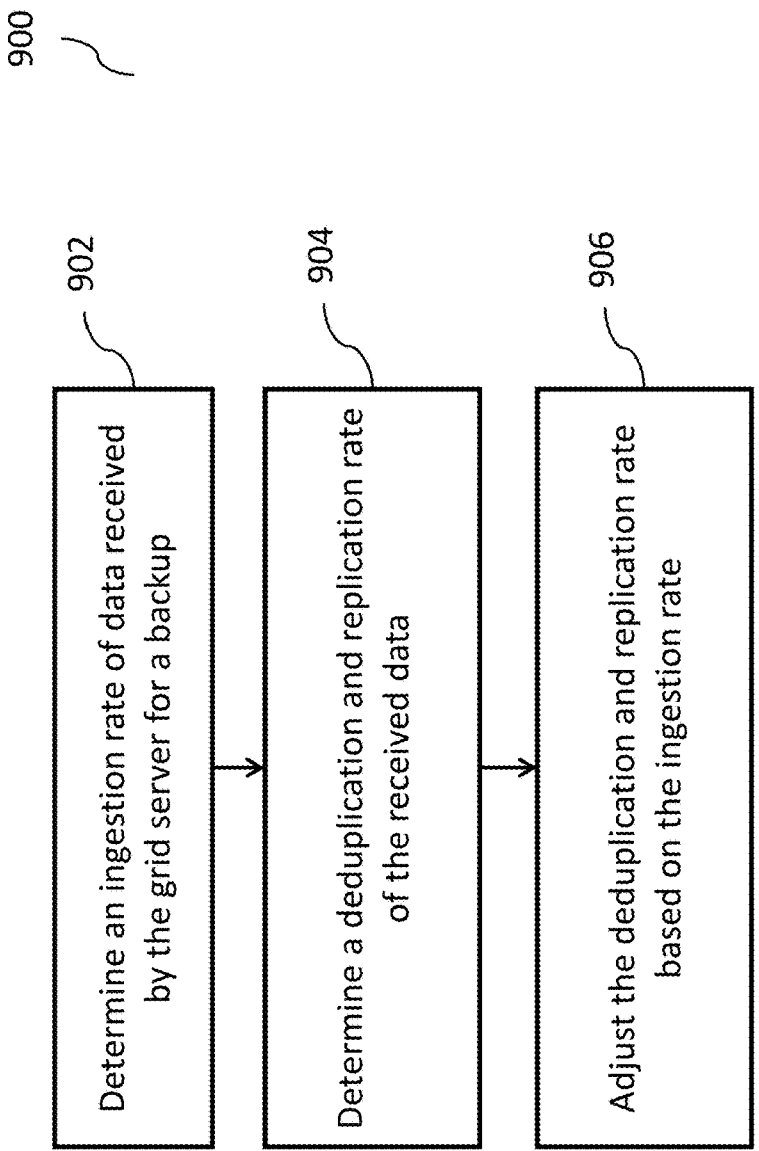
FIG. 9 illustrates an exemplary method, according to some implementations of the current subject matter.

FIG. 9 illustrates an exemplary method 900 for managing grid server system resource(s), according to some implementations of the current subject matter. At 902, a processor of a grid server (e.g., grid server 204 shown in FIG. 2a) in a plurality of grid servers can determine an ingestion rate of data received by the grid server for a backup. The ingestion rate can correspond to a speed of transferring of the received data into a memory of the grid server. At 904, the processor can determine a deduplication and replication rate of the received data. The deduplication can represent a deduplication of the received data by the grid server. The replication can represent replication of the deduplicated received data to another server (e.g., grid servers in repository 210 shown in FIG. 2a). At 906, the deduplication and replication rate can be adjusted based on the ingestion rate. The adjustment can be performed by the processor in the grid server 204.

In some implementations, the current subject matter can include one or more of the following optional features. The adjustment of the deduplication and replication rate can include increasing when the ingestion rate is less than or equal to a first predetermined threshold (e.g., 0-5%, as shown in FIG. 6). The adjustment of the deduplication and replication rate can include unchanging the deduplication and replication rate when the ingestion rate is greater than the first predetermined threshold (e.g., 5%) and less than or equal to a second predetermined threshold (e.g., 20%). The adjustment of the deduplication and replication rate can include reducing the deduplication and replication rate when the ingestion rate is greater than the second predetermined threshold (e.g., 20%) and less than or equal to a third predetermined threshold (e.g., 30%). The adjustment of the deduplication and replication rate can include setting the deduplication and replication rate to a predetermined minimum deduplication and replication rate when the ingestion rate is greater than the third predetermined threshold (i.e., greater than 30%, as shown in FIG. 6).

In some implementations, ingestion, deduplication and replication of data can be performed in parallel. In some implementations, The adjustment of the deduplication and replication rate can include monitoring at least one of the following: a backup process, deduplication and replication processes, a restore process, a copy-to-tape process, a cross-replication process, a purge process, a rebalance process as performed by the grid server. The adjustment can also include performing, based on the monitoring, sampling of at least one of the following: the ingestion rate, and the deduplication and replication rate. The method can also include performing, based on the monitoring and the sampling, using the grid server, at least one of the following: increasing the deduplication and replication rate, decreasing the deduplication and replication rate, increasing the ingestion rate, decreasing the ingestion rate, increasing a protection rate corresponding a combination of the deduplication rate and the replication rate, decreasing the protection rate, and/or any combination thereof. In some implementations, sampling can be performed based on at least one of the following: periodically, automatically, and during a predetermined time interval. The method can also include minimizing, based on the sampling and parallel performance of ingestion, deduplication and replication of data, a recovery point objective time associated with the received data. The recovery point objective time can represent a difference between times when the data is received into the memory of the grid server and when the data is received into a memory of another grid server. The memories of the grid server and another grid server can include at least one of the following: a non-volatile storage medium and a volatile storage medium.

In some implementations, sampling can be performed based on at least one of the following parameter: amount of data stored in a network socket receive buffer associated with the grid server, data packet round trip time associate with transmission of data between at least two grid servers, transmission control protocol advertised receive buffer size, bandwidth of a network including the grid server, a time to complete at least one disk read/write input/output request associated with the grid server, and/or any combination thereof. The method can also include performing smoothing of the at least one parameter over a predetermined period of time, generating, based on the smoothing, an ingestion score value, comparing the generated ingestion score value with a threshold ingestion score value, and performing, based on the comparing, the adjusting of the deduplication and replication rate.

In some implementations, the received data can be stored temporarily in a temporary storage location of the grid server. The method can also include transferring the received data from the temporary storage location of the grid server for deduplication and replication by the grid server. Further, the method can include performing, based on the received data temporarily stored in the temporary storage location of the grid server, at an increased speed at least one of the following: generating at least one backup tape, generating at least one virtual machine image, performing an instant recovery of the received data from the temporary storage location, and restoring at least one file.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer implemented method, comprising
   sensing, by a processor of a grid server in a plurality of grid servers, an ingestion rate of data received by the grid server for a backup, the ingestion rate corresponding to a speed of transferring of the received data into a memory of the grid server, the data is received from at least one data management application communicatively coupled to the plurality of grid servers;
   monitoring, by the processor of the grid server, a deduplication and replication rate of the received data, the ingestion rate is being dependent on the deduplication and replication rate,
      the deduplication including deduplicating the received data by the grid server based on a determination that at least one zone stamp of a zone within the received data is similar to at least another zone stamp of another zone within the received data, and
      the replication including replicating the deduplicated received data to another server in the plurality of servers, the another server being communicatively coupled to the grid server using a communications network; and
   adjusting, by the processor of the grid server, the deduplication and replication rate based on the sensed ingestion rate, wherein the adjusting includes:
      monitoring at least one of the following: a backup process, deduplication and replication processes, a restore process, a copy-to-tape process, a cross-replication process, a purge process, a rebalance process as performed by the grid server; and
      performing, based on the monitoring, sampling of at least one of the following: the ingestion rate, and the deduplication and replication rate;
   performing ingestion, deduplication and replication of data in parallel; and
   minimizing, based on the sampling and parallel performance of ingestion, deduplication and replication of data, a recovery point objective time associated with the received data, the recovery point objective time representing a difference between times when the data is received into the memory of the grid server and when the data is received into a memory of another grid server.

2. The method according to claim 1, wherein the adjusting further includes increasing the deduplication and replication rate when the ingestion rate is less than or equal to a first predetermined threshold.

3. The method according to claim 2, wherein the adjusting further includes unchanging the deduplication and replication rate when the ingestion rate is greater than the first predetermined threshold and less than or equal to a second predetermined threshold.

4. The method according to claim 3, wherein the adjusting further includes reducing the deduplication and replication rate when the ingestion rate is greater than the second predetermined threshold and less than or equal to a third predetermined threshold.

5. The method according to claim 4, wherein the adjusting further include setting the deduplication and replication rate to a predetermined minimum deduplication and replication rate when the ingestion rate is greater than the third predetermined threshold.

6. The method according to claim 1, further comprising
   performing, based on the monitoring and the sampling, using the grid server, at least one of the following: increasing the deduplication and replication rate, decreasing the deduplication and replication rate, increasing the ingestion rate, decreasing the ingestion rate, increasing a protection rate corresponding a combination of the deduplication rate and the replication rate, decreasing the protection rate, and/or any combination thereof.

7. The method according to claim 1, wherein the sampling is performed based on at least one of the following: periodically, automatically, and during a predetermined time interval.

8. The method according to claim 1, wherein the memories of the grid server and another grid server include at least one of the following: a non-volatile storage medium and a volatile storage medium.

9. The method according to claim 1, wherein the sampling is performed based on at least one of the following parameter: amount of data stored in a network socket receive buffer associated with the grid server, data packet round trip time associate with transmission of data between at least two grid servers, transmission control protocol advertised receive buffer size, bandwidth of a network including the grid server, a time to complete at least one disk read/write input/output request associated with the grid server, and/or any combination thereof.

10. The method according to claim 9, further comprising
performing smoothing of the at least one parameter over a predetermined period of time;
generating, based on the smoothing, an ingestion score value;
comparing the generated ingestion score value with a threshold ingestion score value; and
performing, based on the comparing, the adjusting of the deduplication and replication rate.

11. The method according to claim 1, wherein the received data is stored temporarily in a temporary storage location of the grid server.

12. The method according to claim 11, further comprising transferring the received data from the temporary storage location of the grid server for deduplication and replication by the grid server.

13. The method according to claim 11, further comprising performing, based on the received data temporarily stored in the temporary storage location of the grid server, at an increased speed at least one of the following: generating at least one backup tape, generating at least one virtual machine image, performing an instant recovery of the received data from the temporary storage location, and restoring at least one file.

14. A system comprising:
at least one programmable processor; and
a machine-readable medium storing instructions that, when executed by the at least one programmable processor, cause the at least one programmable processor to perform operations comprising:
sensing, by a processor of a grid server in a plurality of grid servers, an ingestion rate of data received by the grid server for a backup, the ingestion rate corresponding to a speed of transferring of the received data into a memory of the grid server, the data is received from at least one data management application communicatively coupled to the plurality of grid servers;
monitoring, by the processor of the grid server, a deduplication and replication rate of the received data, the ingestion rate is being dependent on the deduplication and replication rate,
the deduplication including deduplicating the received data by the grid server based on a determination that at least one zone stamp of a zone within the received data is similar to at least another zone stamp of another zone within the received data, and
the replication including replicating the deduplicated received data to another server in the plurality of servers, the another server being communicatively coupled to the grid server using a communications network; and
adjusting, by the processor of the grid server, the deduplication and replication rate based on the sensed ingestion rate, wherein the adjusting includes:
monitoring at least one of the following: a backup process, deduplication and replication processes, a restore process, a copy-to-tape process, a cross-replication process, a purge process, a rebalance process as performed by the grid server; and
performing, based on the monitoring, sampling of at least one of the following: the ingestion rate, and the deduplication and replication rate;
performing ingestion, deduplication and replication of data in parallel; and
minimizing, based on the sampling and parallel performance of ingestion, deduplication and replication of data, a recovery point objective time associated with the received data, the recovery point objective time representing a difference between times when the data is received into the memory of the grid server and when the data is received into a memory of another grid server.

15. The system according to claim 14, wherein the adjusting further includes increasing the deduplication and replication rate when the ingestion rate is less than or equal to a first predetermined threshold.

16. The system according to claim 15, wherein the adjusting further includes unchanging the deduplication and replication rate when the ingestion rate is greater than the first predetermined threshold and less than or equal to a second predetermined threshold.

17. The system according to claim 16, wherein the adjusting further includes reducing the deduplication and replication rate when the ingestion rate is greater than the second predetermined threshold and less than or equal to a third predetermined threshold.

18. The system according to claim 17, wherein the adjusting further include setting the deduplication and replication rate to a predetermined minimum deduplication and replication rate when the ingestion rate is greater than the third predetermined threshold.

19. The system according to claim 14, wherein the operations further comprise
performing, based on the monitoring and the sampling, using the grid server, at least one of the following: increasing the deduplication and replication rate, decreasing the deduplication and replication rate, increasing the ingestion rate, decreasing the ingestion rate, increasing a protection rate corresponding a combination of the deduplication rate and the replication rate, decreasing the protection rate, and/or any combination thereof.

20. The system according to claim 14, wherein the sampling is performed based on at least one of the following: periodically, automatically, and during a predetermined time interval.

21. The system according to claim 14, wherein the memories of the grid server and another grid server include at least one of the following: a non-volatile storage medium and a volatile storage medium.

22. The system according to claim 14, wherein the sampling is performed based on at least one of the following parameter: amount of data stored in a network socket receive buffer associated with the grid server, data packet round trip time associate with transmission of data between at least two grid servers, transmission control protocol advertised receive buffer size, bandwidth of a network including the grid server, a time to complete at least one disk read/write input/output request associated with the grid server, and/or any combination thereof.

23. The system according to claim 22, wherein the operations further comprise
performing smoothing of the at least one parameter over a predetermined period of time;
generating, based on the smoothing, an ingestion score value;
comparing the generated ingestion score value with a threshold ingestion score value; and
performing, based on the comparing, the adjusting of the deduplication and replication rate.

24. The system according to claim 14, wherein the received data is stored temporarily in a temporary storage location of the grid server.

25. The system according to claim 24, wherein the operations further comprise transferring the received data from the temporary storage location of the grid server for deduplication and replication by the grid server.

26. The system according to claim 24, wherein the operations further comprise performing, based on the received data temporarily stored in the temporary storage location of the grid server, at an increased speed at least one of the following: generating at least one backup tape, generating at least one virtual machine image, performing an instant recovery of the received data from the temporary storage location, and restoring at least one file.

27. A computer program product comprising a machine-readable medium storing instructions that, when executed by at least one programmable processor, cause the at least one programmable processor to perform operations comprising:
sensing, by a processor of a grid server in a plurality of grid servers, an ingestion rate of data received by the grid server for a backup, the ingestion rate corresponding to a speed of transferring of the received data into a memory of the grid server, the data is received from at least one data management application communicatively coupled to the plurality of grid servers;
monitoring, by the processor of the grid server, a deduplication and replication rate of the received data, the ingestion rate is being dependent on the deduplication and replication rate,
the deduplication including deduplicating the received data by the grid server based on a determination that at least one zone stamp of a zone within the received data is similar to at least another zone stamp of another zone within the received data, and
the replication including replicating the deduplicated received data to another server in the plurality of servers, the another server being communicatively coupled to the grid server using a communications network; and
adjusting, by the processor of the grid server, the deduplication and replication rate based on the sensed ingestion rate, wherein the adjusting includes:
monitoring at least one of the following: a backup process, deduplication and replication processes, a restore process, a copy-to-tape process, a cross-replication process, a purge process, a rebalance process as performed by the grid server; and
performing, based on the monitoring, sampling of at least one of the following: the ingestion rate, and the deduplication and replication rate;
performing ingestion, deduplication and replication of data in parallel; and
minimizing, based on the sampling and parallel performance of ingestion, deduplication and replication of data, a recovery point objective time associated with the received data, the recovery point objective time representing a difference between times when the data is received into the memory of the grid server and when the data is received into a memory of another grid server.

28. The computer program product according to claim 27, wherein the adjusting further includes increasing the deduplication and replication rate when the ingestion rate is less than or equal to a first predetermined threshold.

29. The computer program product according to claim 28, wherein the adjusting further includes unchanging the deduplication and replication rate when the ingestion rate is greater than the first predetermined threshold and less than or equal to a second predetermined threshold.

30. The computer program product according to claim 29, wherein the adjusting further includes reducing the deduplication and replication rate when the ingestion rate is greater than the second predetermined threshold and less than or equal to a third predetermined threshold.

31. The computer program product according to claim 30, wherein the adjusting further include setting the deduplication and replication rate to a predetermined minimum deduplication and replication rate when the ingestion rate is greater than the third predetermined threshold.

32. The computer program product according to claim 27, wherein the operations further comprise
performing, based on the monitoring and the sampling, using the grid server, at least one of the following: increasing the deduplication and replication rate, decreasing the deduplication and replication rate, increasing the ingestion rate, decreasing the ingestion rate, increasing a protection rate corresponding a combination of the deduplication rate and the replication rate, decreasing the protection rate, and/or any combination thereof.

33. The computer program product according to claim 27, wherein the sampling is performed based on at least one of the following: periodically, automatically, and during a predetermined time interval.

34. The computer program product according to claim 27, wherein the memories of the grid server and another grid server include at least one of the following: a non-volatile storage medium and a volatile storage medium.

35. The computer program product according to claim 27, wherein the sampling is performed based on at least one of the following parameter: amount of data stored in a network socket receive buffer associated with the grid server, data packet round trip time associate with transmission of data between at least two grid servers, transmission control protocol advertised receive buffer size, bandwidth of a network including the grid server, a time to complete at least one disk read/write input/output request associated with the grid server, and/or any combination thereof.

36. The computer program product according to claim 35, wherein the operations further comprise
performing smoothing of the at least one parameter over a predetermined period of time;

generating, based on the smoothing, an ingestion score value;

comparing the generated ingestion score value with a threshold ingestion score value; and performing, based on the comparing, the adjusting of the deduplication and replication rate.

37. The computer program product according to claim 27, wherein the received data is stored temporarily in a temporary storage location of the grid server.

38. The computer program product according to claim 37 wherein the operations further comprise transferring the received data from the temporary storage location of the grid server for deduplication and replication by the grid server.

39. The computer program product according to claim 37, wherein the operations further comprise performing, based on the received data temporarily stored in the temporary storage location of the grid server, at an increased speed at least one of the following: generating at least one backup tape, generating at least one virtual machine image, performing an instant recovery of the received data from the temporary storage location, and restoring at least one file.

* * * * *